United States Patent
Wang et al.

(10) Patent No.: US 10,175,833 B2
(45) Date of Patent: Jan. 8, 2019

(54) ADAPTIVE FORCE SENSING

(71) Applicant: SYNAPTICS INCORPORATED, San Jose, CA (US)

(72) Inventors: Ying Wang, Fremont, CA (US); Adam L. Schwartz, Redwood City, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 65 days.

(21) Appl. No.: 15/080,146

(22) Filed: Mar. 24, 2016

(65) Prior Publication Data

US 2016/0370909 A1 Dec. 22, 2016

Related U.S. Application Data

(60) Provisional application No. 62/181,555, filed on Jun. 18, 2015.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 3/0418* (2013.01); *G06F 2203/04105* (2013.01)

(58) Field of Classification Search
CPC ...... G06F 3/044; G06F 3/0416; G06F 3/0418; G06F 2303/04105
See application file for complete search history.

(56) References Cited

U.S. PATENT DOCUMENTS

| | | |
|---|---|---|
| 5,543,590 A | 8/1996 | Gillespie et al. |
| 8,344,883 B2 | 1/2013 | Ujii et al. |
| 2003/0210235 A1* | 11/2003 | Roberts ................. G06F 3/0414 345/173 |
| 2003/0214485 A1* | 11/2003 | Roberts ................. G06F 3/0414 345/173 |
| 2006/0284858 A1 | 12/2006 | Rekimoto |
| 2009/0153340 A1 | 6/2009 | Pinder et al. |
| 2009/0160793 A1 | 6/2009 | Rekimoto |
| 2009/0237374 A1 | 9/2009 | Li et al. |
| 2010/0079404 A1 | 4/2010 | Degner et al. |
| 2010/0156823 A1* | 6/2010 | Paleczny ................. G06F 3/041 345/173 |
| 2010/0271326 A1 | 10/2010 | Hu et al. |
| 2011/0141052 A1 | 6/2011 | Bernstein et al. |
| 2013/0093715 A1 | 4/2013 | Marsden et al. |
| 2015/0084874 A1 | 3/2015 | Cheng et al. |
| 2015/0091859 A1* | 4/2015 | Rosenberg ............. G06F 3/044 345/174 |
| 2015/0116205 A1 | 4/2015 | Westerman et al. |

* cited by examiner

*Primary Examiner* — Sahlu Okebato
(74) *Attorney, Agent, or Firm* — Patterson + Sheridan, LLP

(57) ABSTRACT

A method of operating a force-sensitive input device having an input surface comprises declaring a first press action upon detecting an amount of force applied to the input surface that exceeds a first no-press force value by at least a first press threshold value, determining a maximum force value applied to the input surface during the first press action, and setting a release threshold value for a subsequent release action based on the determined maximum force value.

20 Claims, 10 Drawing Sheets

ADAPTIVE FORCE SENSING

CROSS-REFERENCE TO RELATED APPLICATIONS

This application claims benefit of U.S. provisional patent application Ser. No. 62/181,555, filed Jun. 18, 2015 entitled "System And Method For Adaptive Force Sensor", which is herein incorporated by reference.

BACKGROUND

Field

Embodiments of the present invention generally relate to techniques for operating an input device having a display device with an integrated sensing device.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

One embodiment described herein is a method of operating a force-sensitive input device having an input surface. The method comprises declaring a first press action upon detecting an amount of force applied to the input surface that exceeds a first no-press force value by at least a first press threshold value, determining a maximum force value applied to the input surface during the first press action, and setting a release threshold value for a subsequent release action based on the determined maximum force value.

Another embodiment described herein is a processing system for a force-sensitive input device having an input surface. The processing system comprises a force sensing module communicatively coupled to a plurality of sensor electrodes of the input device. The force sensing module is configured to declare, based on signals received from the plurality of sensor electrodes, a first press action upon detecting an amount of force applied to the input surface exceeding a first no-press force value by at least a first press threshold value. The force sensing module is further configured to determine a maximum force value applied to the input surface during the first press action, and set a release threshold value for a subsequent release action based on the determined maximum force value.

Another embodiment described herein is an input device comprising a plurality of sensor electrodes configured to detect positional information and force information of input objects in a sensing region of the input device, wherein the sensing region overlaps an input surface of the input device. The input device further comprises a processing system communicatively coupled to the plurality of sensor electrodes and configured to declare, based on signals received from the plurality of sensor electrodes, a first press action upon detecting an amount of force applied to the input surface exceeding a first no-press force value by at least a first press threshold value. The processing system is further configured to determine a maximum force value applied to the input surface during the first press action, and set a release threshold value for a subsequent release action based on the determined maximum force value.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

Figure 1:
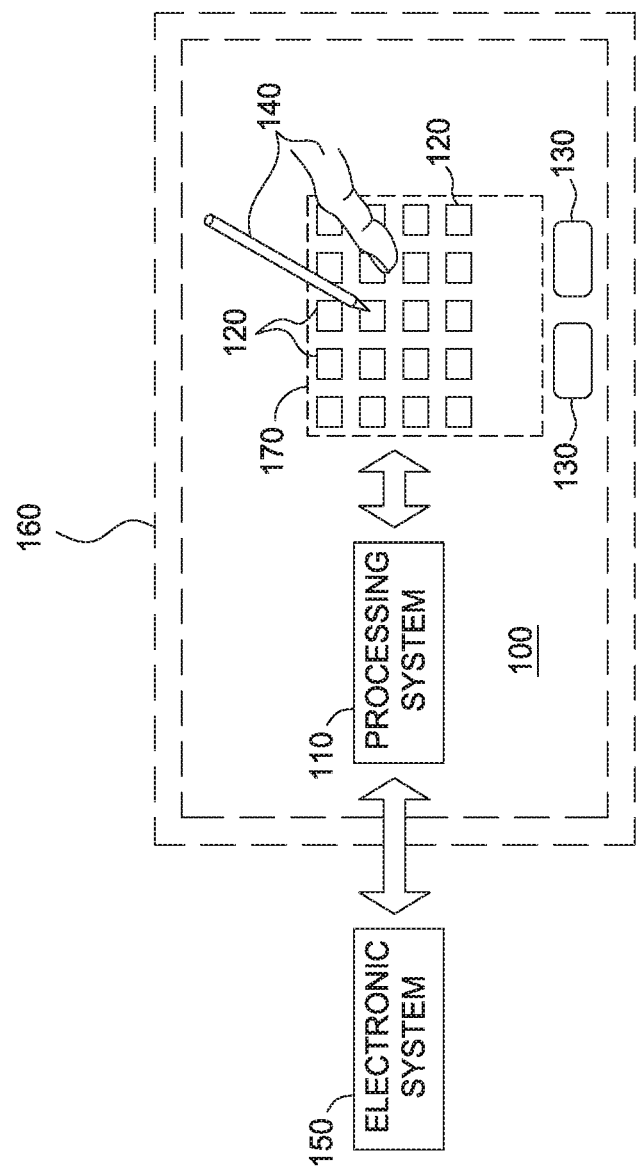
FIG. 1 is a schematic block diagram of an input device, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

Various embodiments of the present technology provide input devices and methods for improving usability. An input device may include electrodes that are operated as sensor electrodes to detect interaction between the input device and an input object (e.g., a stylus or a user's finger).

Conventional implementations of force sensors use fixed threshold values to determine discrete "press" and "release" actions. For example, if a change in capacitance exceeds a first threshold, a "press" action is declared. If the change in capacitance is less than a second threshold, a "release" action is declared. However, a fixed threshold scheme is unable to compensate for certain effects associated with the force sensor implementation. In one example the change in capacitance values, which are used to determine the force measurement, may not immediately return to zero after an applied input force is removed. In another example, even if a user attempts to hold a constant pressure on the input surface, the change in capacitance values may still vary, which tends to result in unintended "release" actions. In another example, input force applied at different positions on the input surface does not have a uniform force response.

According to various embodiments described herein, force sensing performance of the input device may be improved using an adaptive force sensing scheme. High and low values are calculated and maintained by force sensing module to track force input at various times, and the "press" and "release" actions may be defined relative to these high and low values. The high and low values are updated in different ways, depending on the current operational state of the force sensing module. A threshold value for detecting a release action can be calculated based on a maximum force level during a press action. Additionally, location compensation may be applied in order to make a more uniform response across the input surface of the input device.

Exemplary Input Device Implementations

FIG. 1 is a schematic block diagram of an input device 100, in accordance with embodiments of the present technology. In various embodiments, input device 100 comprises a display device integrated with a sensing device. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensor electrodes 120 for detecting user input. The input device 100 may include one or more sensor electrodes 120 that are combined to form sensor electrodes. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensor electrodes 120 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensor electrodes 120 to create electric fields. In some capacitive implementations, separate sensor electrodes 120 may be ohmically shorted together to form larger sensor electrodes. Some capacitive implementations utilize resistive sheets, which may be uniformly resistive.

As discussed above, some capacitive implementations utilize "self-capacitance" (or "absolute capacitance") sensing methods based on changes in the capacitive coupling between sensor electrodes 120 and an input object. In one embodiment, processing system 110 is configured to drive a voltage with known amplitude onto the sensor electrode 120 and measure the amount of charge required to charge the sensor electrode to the driven voltage. In other embodiments, processing system 110 is configured to drive a known current and measure the resulting voltage. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensing electrodes. In various embodiments, an input object 140 near the sensing electrodes alters the electric field between the sensing electrodes, thus changing the measured capacitive coupling. In one implementation, a transcapacitive sensing method operates by detecting the capacitive coupling between one or more transmitter sensing electrodes (also "transmitter electrodes") and one or more receiver sensing electrodes (also "receiver electrodes") as further described below. Transmitter sensing electrodes may be modulated relative to a reference voltage (e.g., system ground) to transmit a transmitter signals. Receiver sensing electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensing electrodes may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensor electrode(s) 120 of the input device 100. In other embodiments, components of processing system 110 are physically separate with one or more components close to sensor electrode(s) 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensor electrodes 120 to detect input, identification modules configured to identify gestures such as mode changing gestures, and mode changing modules for changing operation modes. Processing system 110 may also comprise one or more controllers.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensor electrode(s) 120 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensor electrodes 120. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensor electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Exemplary Sensor Electrode Arrangements

Figure 2:
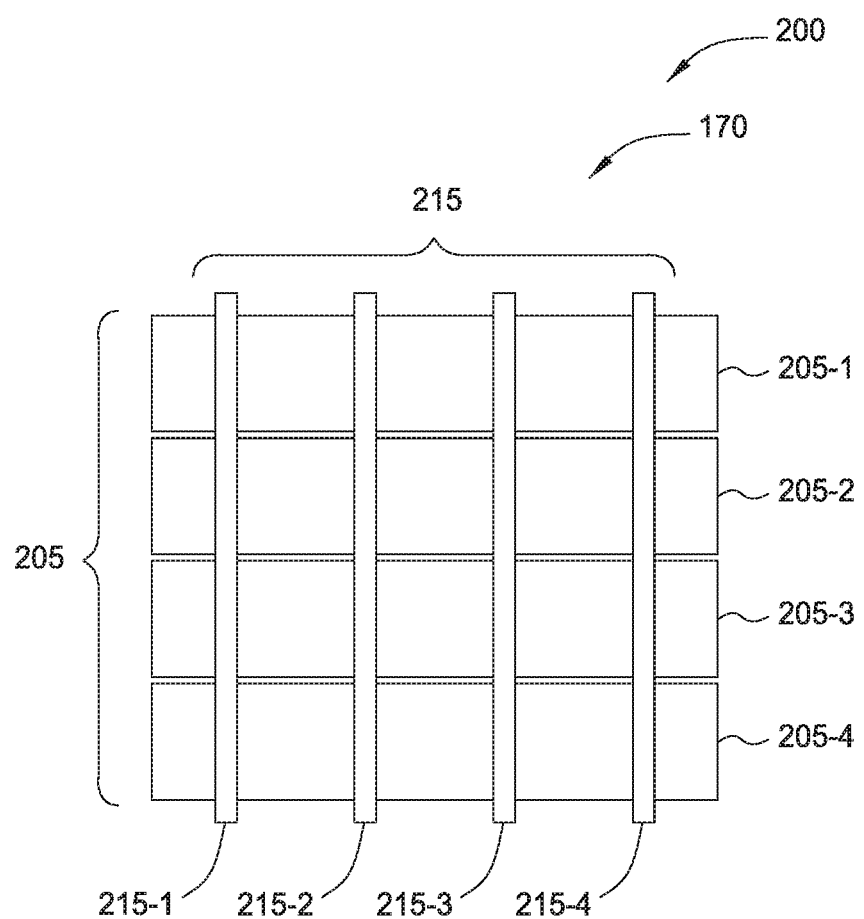
FIGS. 2 and 3 illustrate portions of exemplary sensor electrode arrangements, according to embodiments described herein.
Figure 3:
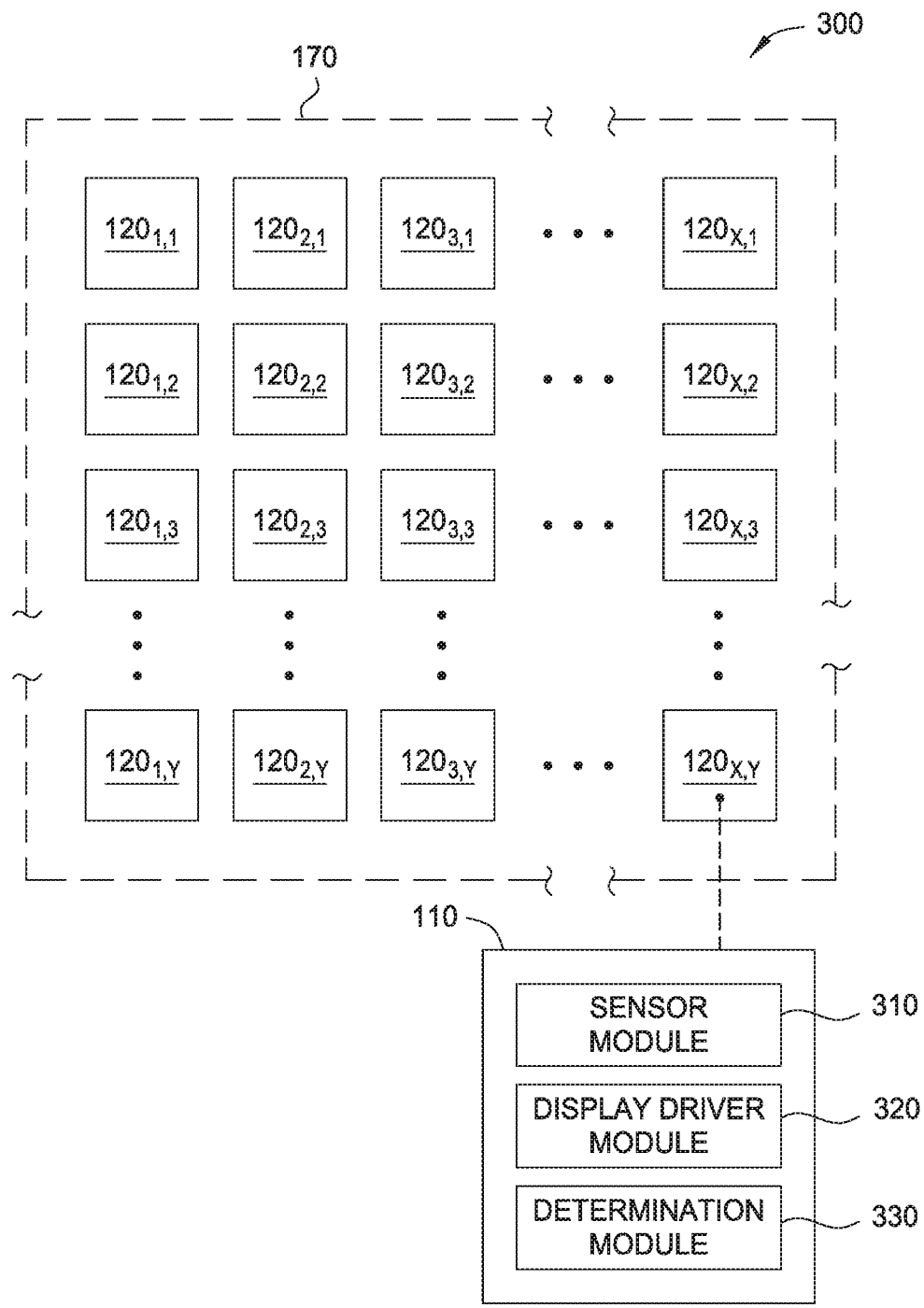

FIGS. 2 and 3 illustrate portions of exemplary sensor electrode arrangements, according to embodiments described herein. Specifically, arrangement 200 (FIG. 2) illustrates a portion of a pattern of sensor electrodes configured to sense in a sensing region 170 associated with the pattern, according to several embodiments. For clarity of illustration and description, FIG. 2 shows the sensor electrodes in a pattern of simple rectangles, and does not show various associated components. This pattern of sensing electrodes comprises a first plurality of sensor electrodes 205 (e.g., 205-1, 205-2, 205-3, 205-4), and a second plurality of sensor electrodes 215 (e.g., 215-1, 215-2, 215-3, 215-4). The sensor electrodes 205, 215 are each examples of the sensor electrodes 120 discussed above. In one embodiment, processing system 110 operates the first plurality of sensor electrodes 205 as a plurality of transmitter electrodes, and the second plurality of sensor electrodes 215 as a plurality of receiver electrodes. In another embodiment, processing system 110 operates the first plurality of sensor electrodes 205 and the second plurality of sensor electrodes 215 as absolute capacitive sensing electrodes.

The first plurality of sensor electrodes 205 and the second plurality of sensor electrodes 215 are typically ohmically isolated from each other. That is, one or more insulators separate the first plurality of sensor electrodes 205 and the second plurality of sensor electrodes 215 and prevent them from electrically shorting to each other. In some embodiments, the first plurality of sensor electrodes 205 and the second plurality of sensor electrodes 215 may be disposed on a common layer. The pluralities of sensor electrodes 205, 215 may be electrically separated by insulative material disposed between them at cross-over areas; in such constructions, the first plurality of sensor electrodes 205 and/or the second plurality of sensor electrodes 215 may be formed with jumpers connecting different portions of the same electrode. In some embodiments, the first plurality of sensor electrodes 205 and the second plurality of sensor electrodes 215 are separated by one or more layers of insulative material. In some embodiments, the first plurality of sensor electrodes 205 and the second plurality of sensor electrodes 215 are separated by one or more substrates; for example, they may be disposed on opposite sides of the same substrate, or on different substrates that are laminated together.

The pluralities of sensor electrodes 205, 215 may be formed into any desired shapes. Moreover, the size and/or shape of the sensor electrodes 205 may be different than the size and/or shape of the sensor electrodes 215. Additionally, sensor electrodes 205, 215 located on a same side of a substrate may have different shapes and/or sizes. In one embodiment, the first plurality of sensor electrodes 205 may be larger (e.g., having a larger surface area) than the second plurality of sensor electrodes 215, although this is not a requirement. In other embodiments, the first and second pluralities of sensor electrodes 205, 215 may have a similar size and/or shape.

In one embodiment, the first plurality of sensor electrodes 205 extends substantially in a first direction while the second plurality of sensor electrodes 215 extends substantially in a second direction. For example, and as shown in FIG. 2, the first plurality of sensor electrodes 205 extend in one direction, while the second plurality of sensor electrodes 215 extend in a direction substantially orthogonal to the sensor electrodes 205. Other orientations are also possible (e.g., parallel or other relative orientations).

In some embodiments, both the first and second pluralities of sensor electrodes 205, 215 are located outside of a plurality (or display stack) of layers that together form the display device 160. One example of a display stack may include layers such as a lens layer, a one or more polarizer layers, a color filter layer, one or more display electrodes layers, a display material layer, a thin-film transistor (TFT) glass layer, and a backlight layer. However, other arrangements of a display stack are possible. In other embodiments, one or both of the first and second pluralities of sensor electrodes 205, 215 are located within the display stack, whether included as part of a display-related layer or a separate layer. For example, Vcom electrodes within a particular display electrode layer can be configured to perform both display updating and capacitive sensing.

Arrangement 300 of FIG. 3 illustrates a portion of a pattern of sensor electrodes configured to sense in sensing region 170, according to several embodiments. For clarity of illustration and description, FIG. 3 shows the sensor electrodes 120 in a pattern of simple rectangles and does not show other associated components. The exemplary pattern comprises an array of sensor electrodes $120_{X,Y}$ arranged in X columns and Y rows, wherein X and Y are positive integers, although one of X and Y may be zero. It is contemplated that the pattern of sensor electrodes 120 may have other configurations, such as polar arrays, repeating patterns, non-repeating patterns, a single row or column, or other suitable arrangement. Further, in various embodiments the number of sensor electrodes 120 may vary from row to row and/or column to column. In one embodiment, at least one row and/or column of sensor electrodes 120 is offset from the others, such it extends further in at least one direction than the others. The sensor electrodes 120 is coupled to the processing system 110 and utilized to determine the presence (or lack thereof) of an input object in the sensing region 170.

In a first mode of operation, the arrangement of sensor electrodes 120 ($120_{1,1}$, $120_{2,1}$, $120_{3,1}$, ..., $120_{X,Y}$) may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

In some embodiments, the arrangement 300 includes one or more grid electrodes (not shown) that are disposed between at least two of the sensor electrodes 120. The grid electrode(s) may at least partially circumscribe the plurality of sensor electrodes 120 as a group, and may also, or in the alternative, completely or partially circumscribe one or more of the sensor electrodes 120. In one embodiment, the grid electrode is a planar body having a plurality of apertures, where each aperture circumscribes a respective one of the sensor electrodes 120. In other embodiments, the grid electrode(s) comprise a plurality of segments that may be driven individually or in groups or two or more segments. The grid electrode(s) may be fabricated similar to the sensor electrodes 120. The grid electrode(s), along with sensor electrodes 120, may be coupled to the processing system 110 utilizing conductive routing traces and used for input object detection.

The sensor electrodes 120 are typically ohmically isolated from each other, and are also ohmically isolated from the grid electrode(s). That is, one or more insulators separate the sensor electrodes 120 and grid electrode(s) and prevent them from electrically shorting to each other. In some embodiments, the sensor electrodes 120 and grid electrode(s) are separated by an insulative gap, which may be filled with an electrically insulating material, or may be an air gap. In some embodiments, the sensor electrodes 120 and the grid electrode(s) are vertically separated by one or more layers of insulative material. In some other embodiments, the sensor electrodes 120 and the grid electrode(s) are separated by one or more substrates; for example, they may be disposed on opposite sides of the same substrate, or on different substrates. In yet other embodiments, the grid electrode(s) may be composed of multiple layers on the same substrate, or on different substrates. In one embodiment, a first grid electrode may be formed on a first substrate (or a first side of a substrate) and a second grid electrode may be formed on a second substrate (or a second side of a substrate). For example, a first grid electrode comprises one or more common electrodes disposed on a thin-film transistor (TFT) layer of the display device 160 (FIG. 1) and a second grid electrode is disposed on the color filter glass of the display device 160. The dimensions of the first and second grid electrodes can be equal or differ in at least one dimension.

In a second mode of operation, the sensor electrodes 120 ($120_{1,1}$, $120_{2,1}$, $120_{3,1}$, $120_{X,Y}$) may be utilized to detect the presence of an input object via transcapacitive sensing techniques when a transmitter signal is driven onto the grid electrode(s). That is, processing system 110 is configured to drive the grid electrode(s) with a transmitter signal and to receive resulting signals with each sensor electrode 120, where a resulting signal comprising effects corresponding to the transmitter signal, which is utilized by the processing system 110 or other processor to determine the position of the input object.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

The areas of localized capacitive sensing of capacitive couplings may be termed "capacitive pixels," "touch pixels," "tixels," etc. Capacitive pixels may be formed between an individual sensor electrode 120 and a reference voltage in the first mode of operation, between the sensor electrodes 120 and grid electrode(s) in the second mode of operation, and between groups of sensor electrodes 120 used as transmitter and receiver electrodes (e.g., arrangement 200 of FIG. 2). The capacitive coupling changes with the proximity and motion of input objects in the sensing region 170 associated with the sensor electrodes 120, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit transmitter signals. Transmitters may be operated such that one transmitter electrode transmits at one time, or such that multiple transmitter electrodes transmit at the same time. Where multiple transmitter electrodes transmit simultaneously, the multiple transmitter electrodes may transmit the same transmitter signal and thereby produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes receive the effects and are measured according to a scanning scheme.

The sensor electrodes 120 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made, as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode 120 with a transmitter or other signal and/or voltage potential. In one embodiment, the switching element may be configured to couple more than one receiver electrode to a common receiver at the same time.

In other embodiments, "scanning" sensor electrodes 120 to determine these capacitive couplings comprises modulating one or more of the sensor electrodes and measuring an absolute capacitance of the one or sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment, each of the sensor electrodes 120 are simultaneously driven and received with, obtaining an absolute capacitive measurement simultaneously from each of the sensor electrodes 120. In various embodiments, processing system 110 may be configured to selectively modulate a portion of sensor electrodes 120. For example, the sensor electrodes may be selected based on, but not limited to, an application running on the host processor, a status of the input device, and an operating mode of the sensing device. In various embodiments, processing system 110 may be configured to selectively shield at least a portion of sensor electrodes 120 and to selectively shield or transmit with the grid electrode(s) 122 while selectively receiving and/or transmitting with other sensor electrodes 120.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 120 may be ganged together such that the sensor electrodes 120 are simultaneously modulated or simultaneously received with. As compared to the methods described above, ganging together multiple sensor electrodes may produce a coarse capacitive image that may not be usable to discern precise positional information. However, a coarse capacitive image may be used to sense presence of an input object. In one embodiment, the coarse capacitive image may be used to move processing system 110 or the input device 100 out of a "doze" mode or low-power mode. In one embodiment, the coarse capacitive image may be used to move a capacitive sensing IC out of a "doze" mode or low-power mode. In another embodiment, the coarse capacitive image may be used to move at least one of a host IC and a display driver out of a "doze" mode or low-power mode. The coarse capacitive image may correspond to the entire sensor area or only to a portion of the sensor area.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The background capacitance or the baseline capacitance may be present due to stray capacitive coupling between two sensor electrodes, where one sensor electrode is driven with a modulated signal and the other is held stationary relative to system ground, or due to stray capacitive coupling between a receiver electrode and nearby modulated electrodes. In many embodiments, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the active matrix display such as one or more segments of a segmented Vcom electrode (common electrode(s)), a source drive line, gate line, an anode sub-pixel electrode or cathode pixel electrode, or any other suitable display element. These display electrodes may be disposed on an appropriate display screen substrate. For example, the common electrodes may be disposed on the a transparent substrate (a glass substrate, TFT glass, or any other transparent material) in some display screens (e.g., In-Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode," since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 and/or grid electrode(s) comprise one or more common electrodes, various other display electrodes as describe above may also be used in conjunction with the common electrode or as an alternative to the common electrodes. In various embodiments, the sensor electrodes 120 and grid electrode(s) comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer multiple of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Continuing to refer to FIG. 3, the processing system 110 coupled to the sensor electrodes 120 includes a sensor module 310 and optionally, a display driver module 320. The sensor module 310 includes circuitry configured to drive at least one of the sensor electrodes 120 for capacitive sensing during periods in which input sensing is desired. In one embodiment, the sensor module 310 is configured to drive a modulated signal onto the at least one sensor electrode 120 to detect changes in absolute capacitance between the at least one sensor electrode and an input object. In another embodiment, the sensor module 310 is configured to drive a transmitter signal onto the at least one sensor electrode 120 to detect changes in a transcapacitance between the at least one sensor electrode and another sensor electrode 120. The modulated and transmitter signals are generally varying voltage signals comprising a plurality of voltage transitions over a period of time allocated for input sensing. In various embodiments, the sensor electrodes 120 and/or grid electrode(s) may be driven differently in different modes of operation. In one embodiment, the sensor electrodes 120 and/or grid electrode(s) may be driven with signals (modulated signals, transmitter signals and/or shield signals) that may differ in any one of phase, amplitude, and/or shape. In various embodiments, the modulated signal and transmitter signal are similar in at least one shape, frequency, amplitude, and/or phase. In other embodiments, the modulated signal and the transmitter signals are different in frequency, shape, phase, amplitude, and phase. The sensor module 310 may be selectively coupled one or more of the sensor electrodes 120 and/or the grid electrode(s). For example, the sensor module 310 may be coupled selected portions of the sensor electrodes 120 and operate in either an absolute or transcapacitive sensing mode. In another example, the sensor module 310 may be a different portion of the sensor electrodes 120 and operate in either an absolute or transcapacitive sensing mode. In yet another example, the sensor module 310 may be coupled to all the sensor electrodes 120 and operate in either an absolute or transcapacitive sensing mode.

The sensor module 310 is configured to operate the grid electrode(s) as a shield electrode that may shield sensor electrodes 120 from the electrical effects of nearby conductors. In one embodiment, the processing system is configured to operate the grid electrode(s) as a shield electrode that may "shield" sensor electrodes 120 from the electrical effects of nearby conductors, and to guard the sensor electrodes 120 from grid electrode(s), at least partially reducing the parasitic capacitance between the grid electrode(s) and the sensor electrodes 120. In one embodiment, a shielding signal is driven onto the grid electrode(s). The shielding signal may be a ground signal, such as the system ground or other ground, or any other constant voltage (i.e., non-modulated) signal. In another embodiment, operating the grid electrode(s) as a shield electrode may comprise electrically floating the grid electrode. In one embodiment, grid electrode(s) are able to operate as an effective shield electrode while being electrode floated due to its large coupling to the other sensor electrodes. In other embodiment, the shielding signal may be referred to as a "guarding signal" where the guarding signal is a varying voltage signal having at least one of a similar phase, frequency, and amplitude as the modulated signal driven on to the sensor electrodes. In one or more embodiment, routing traces may be shielded from responding to an input object due to routing beneath the grid electrode(s) and/or sensor electrodes 120, and therefore may not be part of the active sensor electrodes, shown as sensor electrodes 120.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiments, the non-display update period may be referred to as a "long horizontal blanking period," "long h-blanking period" or a "distributed blanking period," where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between sensor module 310 and display driver module 320 to provide accurate control of overlapping display updating and capacitive sensing periods with repeatably coherent frequencies and phases. In one embodiment, these synchronization signals may be configured to allow the relatively stable voltages at the beginning and end of the input sensing period to coincide with display update periods with relatively stable voltages (e.g., near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensor module 310 includes circuitry configured to receive resulting signals with the sensor electrodes 120 and/or grid electrode(s) comprising effects corresponding to the modulated signals or the transmitter signals during periods in which input sensing is desired. The sensor module 310 may determine a position of the input object in the sensing region 170 or may provide a signal including information indicative of the resulting signal to another module or processor, for example, a determination module 330 or a processor of an associated electronic device 150 (i.e., a host processor), for determining the position of the input object in the sensing region 170.

The display driver module 320 may be included in or separate from the processing system 110. The display driver module 320 includes circuitry configured to provide display image update information to the display of the display device 160 during non-sensing (e.g., display updating) periods.

In one embodiment, the processing system 110 comprises a first integrated controller comprising the display driver module 320 and at least a portion of the sensor module 310 (i.e., transmitter module and/or receiver module). In another embodiment, the processing system 110 comprises a first integrated controller comprising the display driver module 320 and a second integrated controller comprising the sensor module 310. In yet another embodiment, the processing system comprises a first integrated controller comprising display driver module 320 and a first portion of the sensor module 310 (e.g., one of a transmitter module and a receiver module) and a second integrated controller comprising a second portion of the sensor module 310 (e.g., the other one of the transmitter and receiver modules). In those embodiments comprising multiple integrated circuits, a synchronization mechanism may be coupled between them, configured to synchronize display updating periods, sensing periods, transmitter signals, display update signals, and the like.

Exemplary Force Sensing Arrangements

Figure 4:
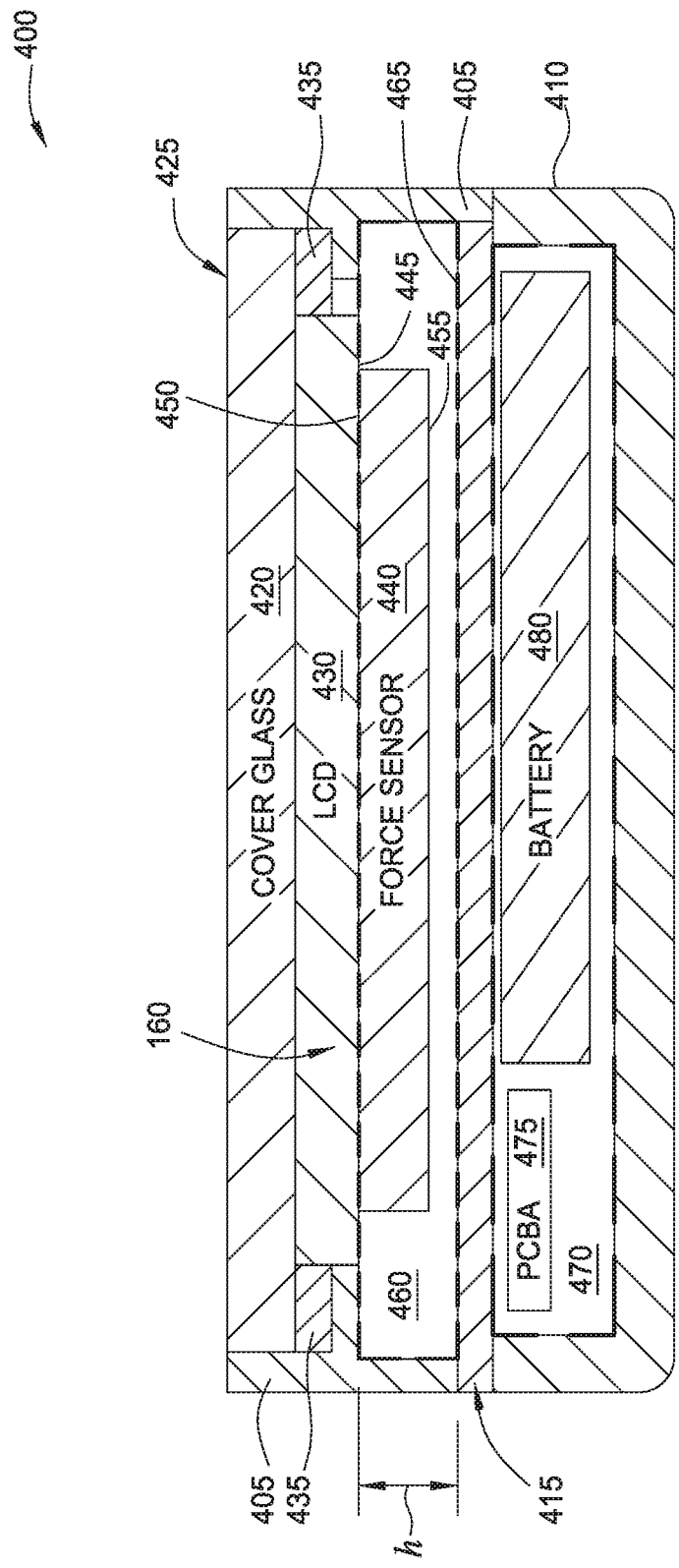
FIG. 4 illustrates an exemplary device including a display and a force sensor, according to embodiments described herein.

FIG. 4 illustrates an exemplary device including a display and a force sensor, according to embodiments described herein. Specifically, FIG. 4 illustrates a cross-sectional view of an exemplary device 400. Some non-limiting examples of device 400 include a smartphone, tablet, and other mobile computing devices.

Device 400 includes a bezel member 405 configured to support and/or retain a display assembly 407 within the device 400. In some embodiments, the bezel member 405 may at least partially circumscribe the display assembly 407. For example, the two separate portions of bezel member 405 shown in FIG. 4 may be a single member having any suitable shape for circumscribing the display assembly 407. The display assembly 407 may be seated against and/or attached with one or more surfaces of the bezel member 405, such as a vertical portion (i.e., aligned along the Z-direction) and a horizontal portion (i.e., aligned along the Y-direction). In some embodiments, the display assembly 407 is attached with a horizontal portion of the bezel member 405 through one or more spacer members 435. The bezel member 405 is further coupled with a rear cover 410. In an alternate embodiment, the bezel member 405 and rear cover 410 are formed as a single component. The combination of the attachment of bezel member 405 with rear cover 410, and seating the display assembly 407 against the bezel member 405, operates to enclose other components of the device 400 and generally provides the appearance of a fully assembled device 400.

As shown, a frame member 415 extends along the X-Y plane and is disposed between bezel member 405 and rear cover 410. The frame member 415 may provide additional rigidity to the assembled device 400, additional coupling points for physical attachment to components of the device 400, etc. The frame member 415 may have a substantially continuous planar shape, or may define one or more openings through which wiring extends to connect components on opposing sides of the frame member 415. The frame member 415 may be fully or partially constructed from metallic materials. In some embodiments, frame member 415 includes a galvanic connection with ground or another voltage reference.

The display assembly 407 includes separate layers for cover glass 420 and for LCD 430. For simplicity, other display-related layers are not shown. Further, in some embodiments, the display assembly 407 includes a plurality of sensor electrodes within one or more layers of the display assembly 407 that are configured to perform touch sensing relative to an input surface 425 of the device 400. As discussed above with respect to FIGS. 1-3, the plurality of sensor electrodes may be included on one or more substrates and disposed on a viewing side of the display assembly 407.

A bottom surface 445 of the LCD 430, a top surface 465 of the frame member 415, and portions of the bezel member 405 define a first volume 460 having a height h in the Z-direction. The first volume 460 may be an air gap or include other dielectric material suitable for capacitance measurements for the force sensor 440. In some embodiments, a force sensor 440 is disposed on a non-viewing side of the display assembly 407 and at least partly within the first volume 460. As shown, the force sensor 440 is coupled with the LCD 430. Generally, force sensor 440 includes one or more electrodes that are configured to be driven, and which have resulting signals measured to determine an amount of applied force. When force is applied to an input surface 425 (e.g., pressing cover glass 420 in the −Z direction), the display assembly 407 deflects downward (due to a bending of the cover glass 420 and/or a compression of the adhesive coupling the cover glass 420 with the bezel member 405), causing the force sensor 440 to displace within the first volume 460. Generally, the displacement causes a change in capacitance from electrode(s) within the force sensor 440 and with the frame member 415. The change in capacitance may be measured and used to determine the amount of force applied to the input surface 425.

In other embodiments, the force sensor 440 is disposed in alternate locations on the non-viewing side of the display assembly 407 within the first volume 460. In one embodiment, the force sensor 440 is mounted on the frame member 415 and the capacitance is measured relative to one or more conductive layers within the LCD 430.

A bottom surface of the frame member 415 and surfaces of the rear cover 410 define a second volume 470 within the device 400. In some embodiments, a printed circuit board assembly (PCBA) 475 and a battery 480 are disposed within the second volume 470. The PCBA 475 is powered by the battery 480 and generally includes some or all of processing system 110 (e.g., sensor module 310, display driver module 320, and/or determination module 330 shown in FIG. 3).

Figure 5A:
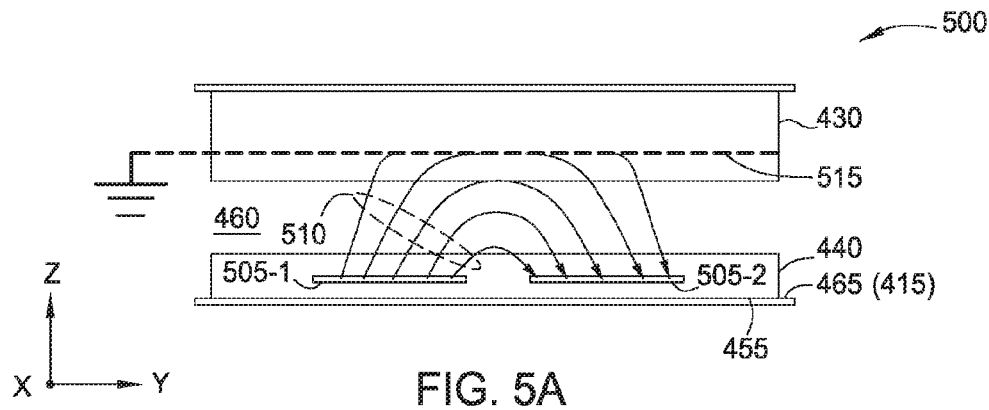
FIGS. 5A-5C illustrate the operation of exemplary implementations of a force sensor, according to embodiments described herein.
Figure 5B:
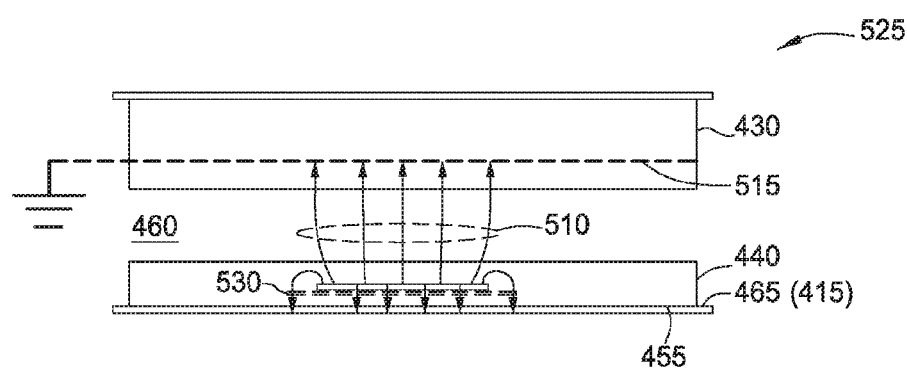
Figure 5C:
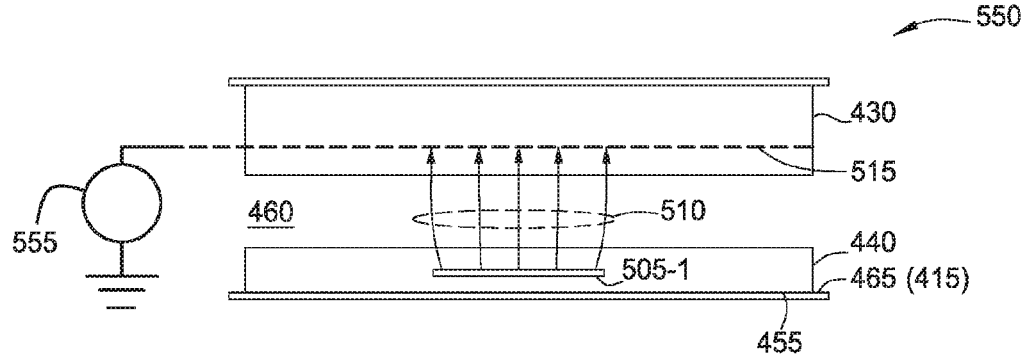

FIGS. 5A-5C illustrate the operation of exemplary implementations of a force sensor, according to embodiments described herein. Specifically, arrangements 500, 525, and 550 illustrate having the force sensor 440 mounted on the frame member 415, although other positioning of the force sensor 440 is possible. While the arrangements 500, 525, 550 show general principles of performing force sensing using capacitance measurements, other types of force sensors are contemplated for use with adaptive force sensing techniques discussed herein. Other non-limiting examples of force sensors include resistive, optical, and piezoelectric.

Arrangement 500 illustrates an exemplary transcapacitive implementation of force sensor 440. The force sensor 440 includes a plurality of sensor electrodes 505-1, 505-2 having any suitable arrangement. As shown, sensor electrode 505-1 is configured to be driven as a transmitter electrode, and sensor electrode 505-2 is configured to receive resulting signals (illustrated by electric field lines 510) comprising effects from the driven transmitter electrode. However, a conductive layer 515 of the LCD 430 is coupled with ground, and causes a reduction to the amount of charge that is transferred between the sensor electrodes 505-1 and 505-2. As the distance between conductive layer 515 and sensor electrodes 505-1, 505-2 is decreased (e.g., during a press), the capacitive coupling between conductive layer 515 and sensor electrodes 505-1, 505-2 increases and more charge is coupled into the conductive layer 515. The different amounts of charge coupled into the sensor electrode 505-2 can be measured and related to the amount of applied force.

Generally, the transcapacitive force sensing implementation may be less sensitive to parasitic capacitances and other environmental factors when compared with an absolute capacitive sensing implementation. However, with sufficient applied force, the air gap may become very thin or may be eliminated entirely. As shown, when the air gap is eliminated the LCD 430 physically contacts the force sensor 440. In other embodiments, another surface such as a conductive frame member physically contacts the force sensor 440. If the air gap is eliminated and the grounding of the surface that contacts the force sensor is imperfect, charge will transfer from the transmitter electrode through the poorly grounded surface and into the receiver electrode. Thus, the measured charge received at the sensor electrode 505-2 may be reduced or in some cases may increase, affecting the accuracy of the resulting signals and potentially producing spurious results.

Arrangement 525 illustrates an exemplary absolute capacitance implementation of force sensor 440. As shown, sensor electrode 505-1 is configured to be driven with a signal and to measure resulting signals comprising effects of the driven signal. Generally, the capacitive couplings between sensor electrode 505-1 and the conductive layer 515 (shown by electric field lines 510) and the frame member 415 (shown by electric field lines 530) affect the amount of charge coupled away from the sensor electrode 505-1, which can be measured and related to the amount of applied force.

The effects of poor grounding, discussed with respect to transcapacitive implementations, are largely mitigated by using an absolute capacitance scheme for at least a portion of the time. In an absolute capacitive scheme, the amount of charge coupled into a surface increases as the surface approaches the force sensor 440; however, the amount of charge will not decrease. However, absolute capacitance measurements can vary due to factors other than the deflection of the force surface. Therefore, in some embodiments, the force sensor 440 is configured to operate in a hybrid mode, where both absolute capacitance and transcapacitance techniques are used to measure force applied to the input surface.

Arrangement 550 shows an exemplary in-cell implementation of a force sensor 440. In arrangement 550, the force sensor 440 measures a capacitive coupling with sensor electrodes disposed within the LCD 430 and used for display updating. In some embodiments, the sensor electrodes are further used for sensing proximity of input objects at or above the input surface. In one embodiment, measurements on the sensor electrode 505-1 are performed during a non-display update period (such as a horizontal blanking period, vertical blanking period, long-horizontal blanking period, etc.). As a result, the sensor electrode 505-1 does not require shielding to prevent noise and unwanted coupling caused by the display updating process. Further, during blanking periods, the common electrode layer (or VCOM) is held at a constant voltage.

In implementations where the force sensor electrode is not connected with the LCD 430, the sensor electrode 505-1 may be configured to measure a capacitive coupling with common electrodes of the LCD 430. The common electrodes may be held together at (or driven with) a constant voltage when the measurement of sensor electrode 505-1 is performed. In such an embodiment, transcapacitance sensing avoids the signal inversion that can occur with poor grounding.

Adaptive Force Sensing

Figure 6:
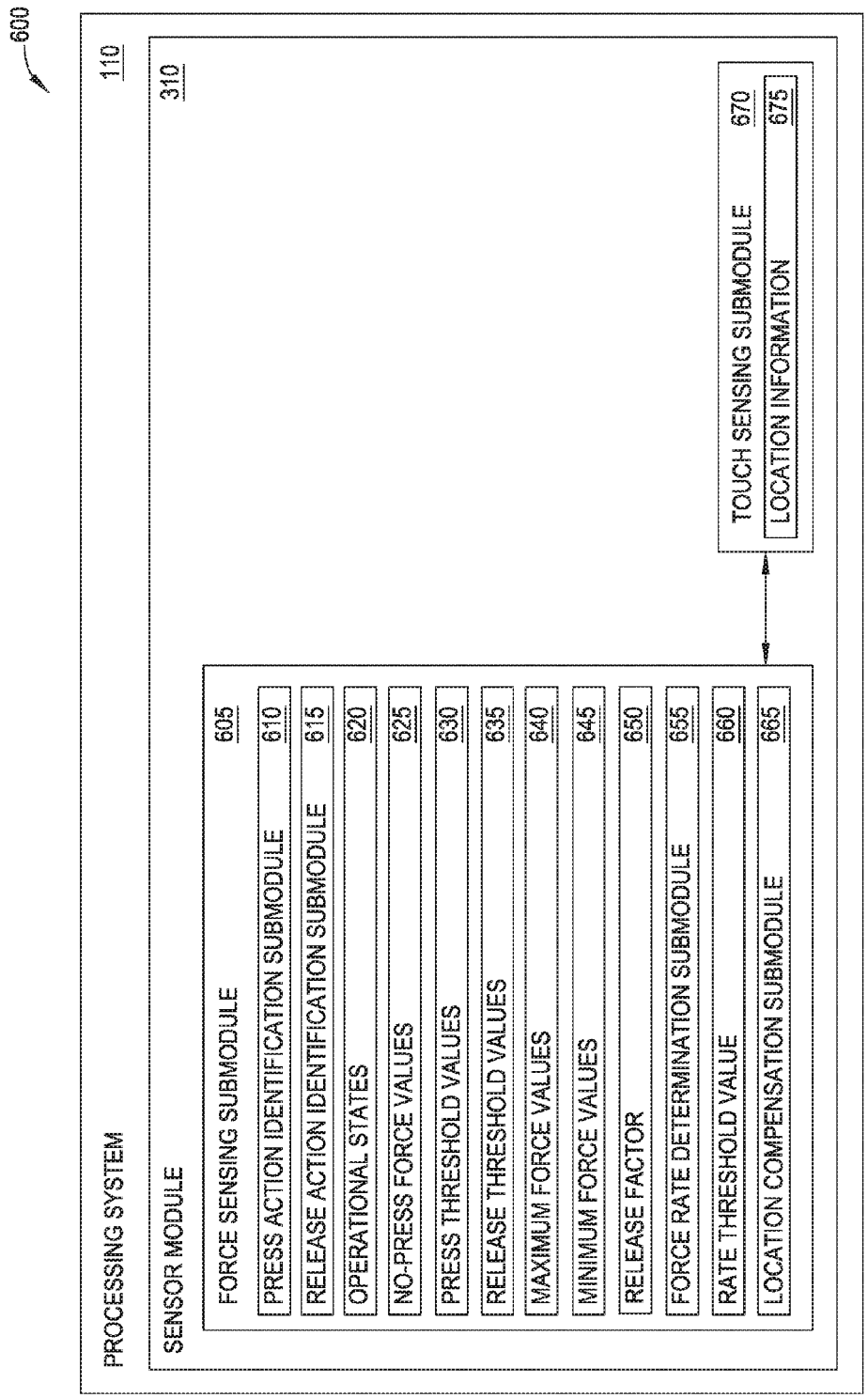
FIG. 6 is a block diagram illustrating an exemplary arrangement of a processing system configured to perform adaptive force sensing, according to embodiments described herein.

FIG. 6 is a block diagram illustrating an exemplary arrangement of a processing system configured to perform adaptive force sensing, according to embodiments described herein. Within processing system 110 of arrangement 600, the sensor module 310 includes a force sensing submodule 605 (or "force sensing module") that is configured to determine force input information for an associated input surface. Generally, capacitive force sensing techniques are discussed; however, the adaptive force sensing techniques may be applied to other types of force sensors.

Force sensing submodule 605 includes a press action identification submodule 610 configured to determine the occurrence of discrete press actions based on measurements performed by an associated force sensor. The release action identification submodule 615 is configured to determine the occurrence of discrete release actions based on force measurements. In some embodiments, the press action and/or release action are configured to transition the force sensing submodule 605 between different operational states 620. Some non-limiting examples of operational states 620 include a "no-press" state, a "press" state, and a "release" state. These examples are discussed in greater detail with respect to FIG. 8.

During operation, the force sensing submodule 605 may determine one or more no-press force values 625, one or more press threshold values 630, one or more release threshold values 635, one or more maximum force values 640, one or more minimum force values 645, and a release factor 650. Each of these values may be used by the press action identification submodule 610 and/or release action identification submodule 615 to determine when to declare a press action or release action. For example, the press action identification submodule 610 may declare a press action when the force measurement exceeds a no-press force value 625 by a press threshold value 630. The no-press force values 625 may be determined based on the minimum force values. Importantly, some implementations of force sensors exhibit effects of hysteresis, where current force measurements are influenced by one or more previous force measurements. The adaptive force sensing techniques discussed herein tend to mitigate (or account for) the effects of hysteresis, thereby providing more consistent and/or accurate force measurement of input.

The force sensing submodule 605 further includes a force rate determination submodule 655 configured to determine a rate of force applied using measurements of the force sensor. In some embodiments, the press action identification module 610 compares the determined force rate with a rate threshold value 660 to determine whether to declare a press action. For example, a slow increase in force measurements could be caused by signal drift, which does not accurately reflect input to the force sensor and should be excluded. The rate threshold value 660 may be set to a value greater than an expected amplitude or range of signal drift. Thus, when the determined force rate exceeds the rate threshold value 660, the force measurements are likely due to actual input to the force sensor instead of signal drift. Accordingly, when the rate threshold value 660 is exceeded, the press action identification module 610 is able to declare a press action when the force measurement exceeds its corresponding threshold value (e.g., a sum of a no-press force value 625 and press threshold value).

The force sensing submodule 605 further includes a location compensation submodule 665. Referring back to FIG. 4, in response to force applied to the input surface, the bending response mode of the cover glass 420 is much more sensitive to pressure applied near the center of the input surface when compared with pressure applied towards the edges (i.e., near bezel member 405).

Returning to FIG. 6, force measurements may be correlated with location information 675 acquired by a touch sensing submodule 670 (or "touch sensing module") to improve force sensing performance in those less-sensitive regions of the input surface. The use of location information 675 may further allow force measurements to determine force applied by each of multiple concurrent inputs (e.g., multi-touch). For example, the force measurements can be zero-dimensional, representing an amount of force without any location information. In such a case, the force measurements alone cannot resolve multiple concurrent inputs. However, the touch sensing module 670 can provide one- or two-dimensional input location information 675 that is correlated with the force measurements.

Figure 7:
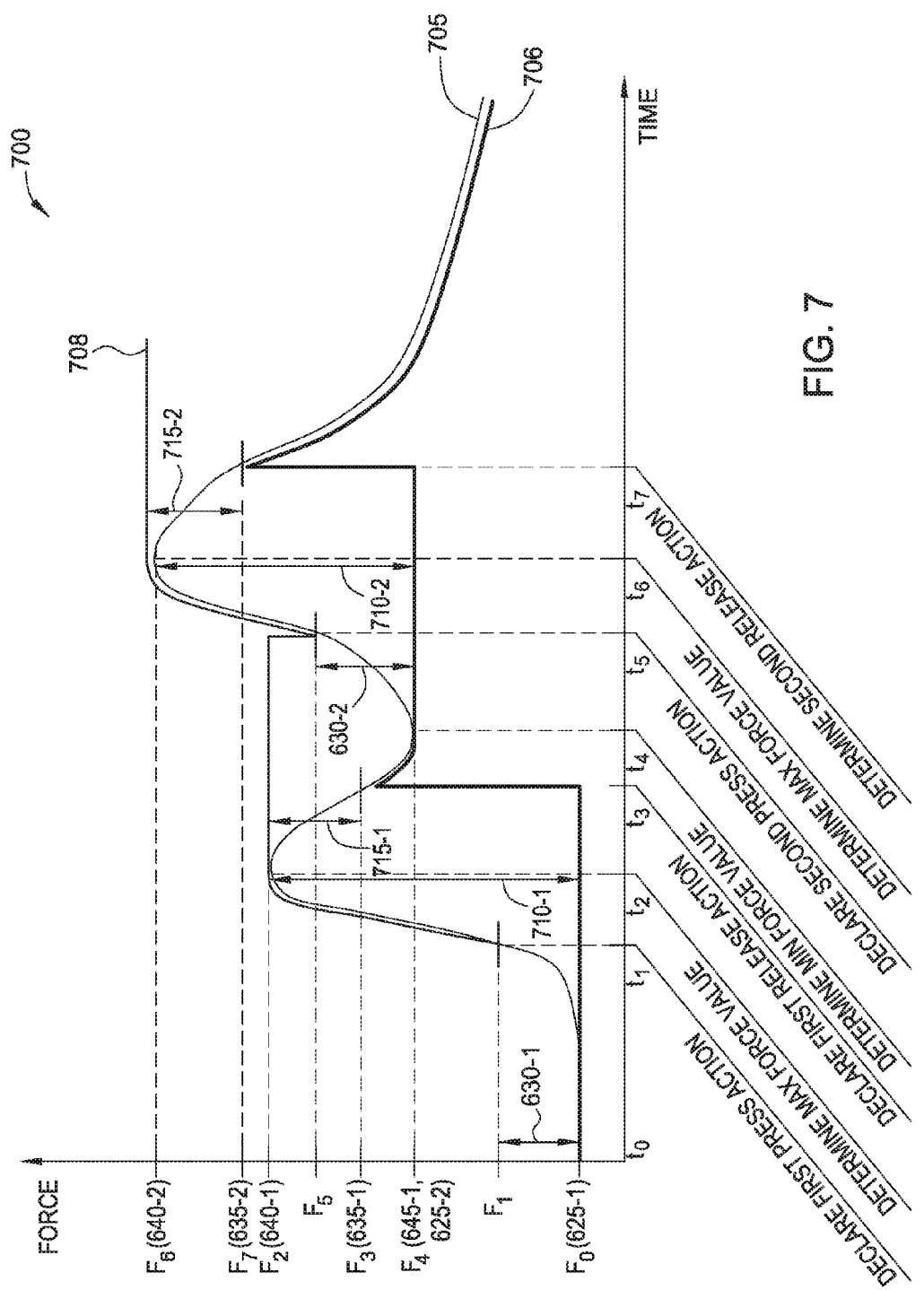
FIG. 7 is a graph illustrating an exemplary adaptive force sensing operation, according to embodiments described herein.

FIG. 7 is a graph illustrating an exemplary adaptive force sensing operation, according to embodiments described herein. More specifically, graph 700 illustrates exemplary operation of a force sensing module 605 (see FIG. 6) based on input received from a force sensor 440 (see FIG. 4). Graph 700 is not drawn to scale; any suitable levels of time and force resolution may be used consistent with the techniques discussed herein.

Force plot 705 reflects force measurements by the force sensor. While force plot 705 is shown as a substantially continuous plot, force plot 705 may alternately be represented by a plurality of discrete force measurements. Further, in some embodiments the force plot 705 may alternately reflect a time-average of acquired force measurements or other signal filtering or smoothing.

For example, the force sensing module may calculate an average delta image value of a current frame, where the average is taken over some or all touch pixels. In the case that a single touch pixel is used, the current delta value may be considered to be the average delta value. The force sensing module may apply a temporal filter, such as an infinite impulse response (IIR), moving average, etc., on the average delta value to generate the force measurement corresponding to frame k, $F_k$. The force measurement may be location compensated based on the position of the touch or press input, which is discussed further with respect to FIG. 9.

Several variables within graph 700 are also described with respect to arrangement 600 of FIG. 6. Notably, the force sensing module may further store other measurements and/or perform other calculations than those explicitly discussed with respect to FIG. 6 (e.g., no-press force values 625, press threshold values 630, release threshold values 635, and so forth). In one non-limiting example, the force sensing module may perform arithmetic operations to determine difference values and/or multiplicative values. However, more complex operations (e.g., statistical) are also possible. Some of the other measurements and/or other calculations may be used to derive the values, factors, etc. discussed with respect to FIG. 6. For example, a multiplicative product of release factor 650 with a maximum force value 640 may be used to determine a release threshold value 635. Some additional examples of variables stored by the force sensing module are shown as a low value plot 706 and a high value plot 708, the operation of each described more fully below.

At time $t_0$, the force measurements are at a first force level $F_0$. Generally, the effects of hysteresis of the force sensor measurements are relatively minimal at time $t_0$ (i.e., the signal represented by force plot 705 is relatively well-settled). In some cases, the stable force level $F_0$ corresponds to a first no-press force value 625-1, during which the force sensing submodule operates in a "no-press" operational state. At time $t_0$, the low value plot 706 tracks a minimum force value, which may be used to determine a difference between the no-press force value 625-1 and a maximum force value 640-1 occurring during a subsequent press action.

At time $t_1$, the force sensing module declares a first press action as force level $F_1$ exceeds the first no-press force value 625-1 by a first press threshold value 630-1. In some embodiments, the force sensing module may also determine the rate (i.e., slope) of the force plot 705, and declare the first press action only when the determined rate exceeds a rate threshold value. As discussed above, the rate threshold value may be set to ensure signal drift and/or other effects do not trigger a press action. In some embodiments, declaring the first press action transitions the force sensing module into a "press" operational state, which generally continues until the occurrence of a subsequent release action (as shown, at time $t_3$). During the press operational state, the high value plot 708 generally tracks values of the force plot 705 until a maximum force value 640-1 is reached at time $t_2$.

At time $t_2$ and force level $F_2$, the force sensing module determines a first maximum force value 640-1 occurring during the press action. After the maximum force value 640-1 is reached during the first press action, the high value plot 708 remains at the maximum force value 640-1.

The force sensing module determines a release threshold value 635-1, which is used to determine a subsequent release action, based on the determined maximum force value 640-1. In some embodiments, the release threshold value 635-1 is set to be a determined amount 715-1 of force less than the maximum force value 640-1. In some embodiments, the amount 715-1 of force is based on a determined difference 710-1 between the maximum force value 640-1 and the no-press force value 625-1. For example, the amount 715-1 of force may be the multiplicative product of a release factor with the difference 710-1 (i.e., scaling the difference 710-1).

At time $t_3$ and force level $F_3$, the force sensing module declares a first release action based on the determined release threshold value 635-1. The force sensing module may transition into a "release" operational state, which may be momentary before transitioning into a "no-press" operational state. During the release operational state, the force sensing module causes the low value plot 706 to begin tracking values of the force plot 705.

In alternate embodiments, declaring a release action may be further based on the force plot 705 decreasing below a predetermined threshold value other than the determined release threshold value 635-1 (which depends on a difference between the dynamically determined high value plot 708 and low value plot 706). For example, the force sensing module may set an amount of force (in absolute terms) as a release threshold value that must be met along with release threshold value 635-1 before declaring that a release action has occurred.

At time $t_4$ and force level $F_4$, the force sensing module determines a minimum force value 645-1 after declaring the first release action. The force sensing module may set minimum force value 645-1 as the second no-press force value 625-2 for determining a subsequent press input. The force sensing module may further determine a second press threshold value 630-2 for the subsequent press input, which in some cases is the same as first press threshold value 630-1. In other cases, the second press threshold value 630-2 differs from first press threshold value 630-1 based on any number of variables determined by the force sensing module (e.g., the minimum force value 645-1). Additionally, the force sensing module may maintain a press factor value analogous to the release factor value discussed above, which is multiplied or otherwise combined with the determined variable(s) to determine the second press threshold value 630-2. The low value plot 706 may remain at the minimum force value 645-1 for determining a subsequent press action.

In alternate embodiments, the release operation state is omitted, and the force sensing module transitions directly from a press operational state to a no-press operational state, in which the minimum force value 645-1, second no-press force value 625-2, and/or second press threshold value 630-2 are determined.

At time $t_5$ and force level $F_5$, the force sensing module declares a second press action upon determining the force level $F_5$ exceeds the second no-press force value 625-2 by second press threshold value 630-2. The force sensing module again transitions into a "press" operational state, and high value plot 708 begins tracking force plot 705 during the second press action until reaching a second maximum force value 640-2 at time $t_6$.

Upon reaching force level $F_6$ at time $t_6$, the force sensing module determines a second release threshold value 635-2 to be an amount 715-2 of force less than the maximum force value 640-2. As with the first release threshold value 635-1, the amount 715-2 may be based on a determined difference 710-2 between maximum force value 640-2 and second no-press force value 625-2, and/or a release factor.

At time $t_7$ and force level $F_7$, the force sensing module determines a second release action. The low value plot 706 resumes tracking values of the force plot 705 for a subsequent press action. Notably, the gradual decay occurring in force plot 705 following time $t_7$ (i.e., after removal of the press) shows the effects of hysteresis. Given enough time without further press inputs, the force plot 705 may settle at a certain force value, such as $F_0$. The adaptive force sensing performed by the force sensing module tends to mitigate (or account for) the effects of hysteresis, as the press thresholds 630-1, 630-2 and release thresholds values 635-1, 635-2 are dynamically defined relative to current values of the force plot 705.

In alternate embodiments, the force sensing module may allow portions of low value plot 706 (e.g., where steady values are shown between times $t_0$-$t_3$ and times $t_4$-$t_7$) and/or high value plot 708 (e.g., where steady values are shown between times $t_2$-$t_5$ and time $t_6$ onward) to be relaxed over time. The relaxation of the values may track environmental or mechanical changes occurring with the force sensor over time.

Figure 8:
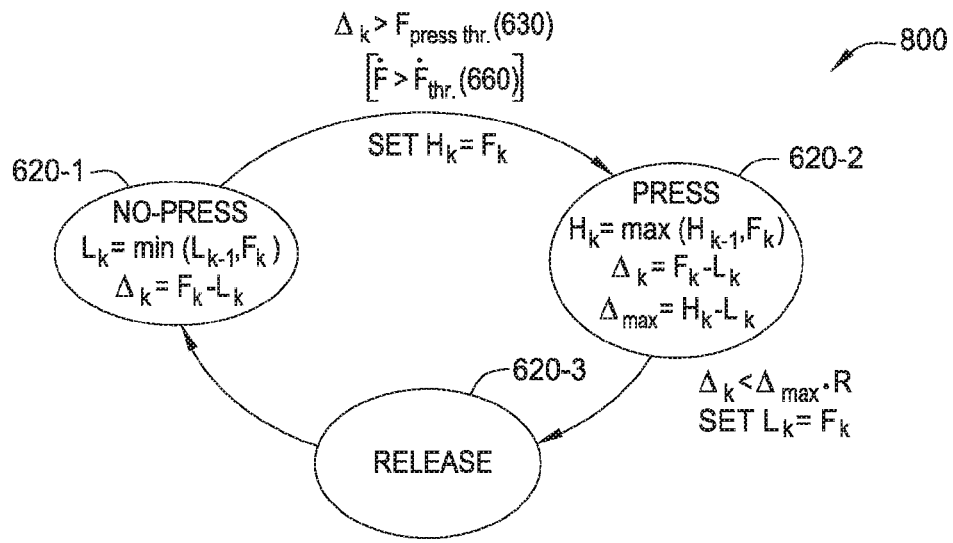
FIG. 8 is a state diagram illustrating exemplary operation of a force sensing module of the processing system, according to embodiments described herein.

FIG. 8 is a state diagram illustrating exemplary operation of a force sensing module of the processing system, according to embodiments described herein. State diagram 800 is generally consistent with the discussion of graph 700 (FIG. 7) and force sensing module 605 (see FIG. 6) above.

Three predefined operational states of the force sensing module are shown in diagram 800: no-press operational state 620-1, press operational state 620-2, and release operational state 620-3. Other numbers of operational states are possible. The force sensing module maintains a number of variables used to perform adaptive force sensing:

low values $L_k$ (e.g., low value plot 706 of FIG. 7), high values $H_k$ (e.g., high value plot 708 of FIG. 7), force measurement values $F_k$ (e.g., force plot 705 of FIG. 7; note that force measurement values $F_k$ may alternately represent an average force measurement over time), difference values $\Delta_k$ (e.g., differences between force measurement values $F_k$ and a selected one of low values $L_k$ and high values $H_k$), a maximum difference value $\Delta_{max}$ (e.g., differences 710-1, 710-2 of FIG. 7), a release factor R (e.g., release factor 650 of FIG. 6), force press threshold $F_{press\ thr}$ (e.g., press threshold values 630 of FIG. 6), force rate values $\dot{F}$, and force rate threshold values $\dot{F}_{thr}$ (e.g., rate threshold value 660 of FIG. 6).

In no-press operational state 620-1, low value $L_k$ is set as the minimum of a previous low value $L_{k-1}$ and the current force measurement value $F_k$. Difference value $\Delta_k$ is set as the difference between the current force measurement value $F_k$ and the determined low value $L_k$. When difference value $\Delta_k$ is greater than the force press threshold $F_{press\ thr}$ (and optionally, the force rate value $\dot{F}$ is greater than force rate threshold value $\dot{F}_{thr}$), a press action is declared and the force sensing module transitions to press operational state 620-2. The force sensing module also sets high value $H_k$ equal to the current force measurement value $F_k$.

In press operational state 620-2, high value $H_k$ is set as the maximum of a previous high value $H_{k-1}$ and the current force measurement value $F_k$. Difference value $\Delta_k$ is set as the difference between the current force measurement value $F_k$ and the determined low value $L_k$. The maximum difference value $\Delta_{max}$ is set as the difference between the high value $H_k$ and the low value $L_k$.

When difference value $\Delta_k$ is less than the multiplicative product of a maximum difference value $\Delta_{max}$ with a release factor R (in some cases, a value between zero and one), the force sensing module transitions to release operational state 620-3 and a release action is declared. The force sensing module also sets low value $L_k$ equal to the current force measurement value $F_k$.

Generally, by adjusting the low values $L_k$ and high values $H_k$ dynamically, hysteresis occurring in measurements from the force sensor is accounted for. Dynamically setting the release threshold as a fraction of the maximum difference value $\Delta_{max}$ detected during the press state 620-2 prevents false detection of release actions caused by relatively small variations in the applied force.

Figure 9:
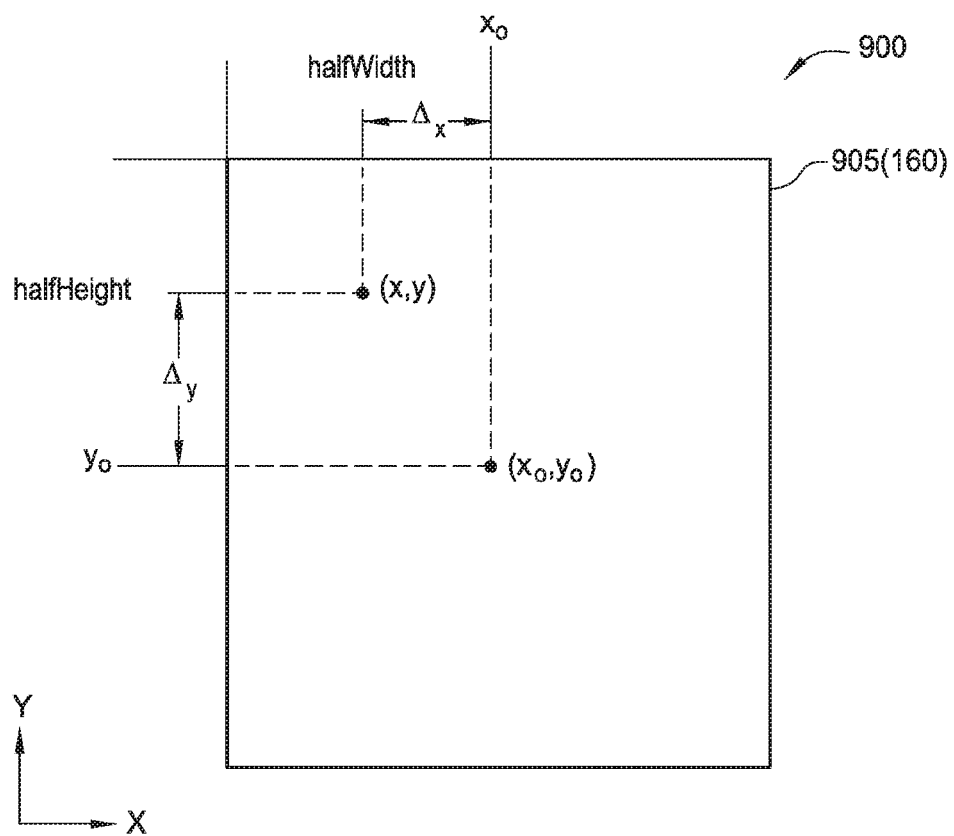
FIG. 9 is a diagram illustrating exemplary location compensation for force sensing, according to embodiments described herein.

FIG. 9 is a diagram illustrating exemplary location compensation for force sensing, according to embodiments described herein. More specifically, diagram 900 illustrates exemplary operation of the location compensation submodule 665 of FIG. 6. As discussed above, location compensation may be advantageous as the bending response may vary across the surface area of an input surface. In some cases, such as device 400 of FIG. 4, the cover glass of the display device 160 is supported around its periphery and is more sensitive to pressure applied near the center of the input surface 905 when compared with pressure applied near the lateral edges.

Location compensation may be applied at any suitable stage of force sensing processing. Some non-limiting examples include application of location compensation on non-filtered average change in capacitance measurements, on filtered average change in capacitance measurements, a force level report based on the filtered average change in capacitance measurements, and so forth.

Similarly, any suitable algorithms may be used to perform location compensation. In one non-limiting example, Equations 1 and 2 are used to calculate compensation values along x and y dimensions and one of Equations 3a and 3b is used to calculate two-dimensional compensation values:

$$compensationX = \frac{abs(x - x_0)}{halfWidth} * k + 1 \quad (1)$$

$$compensationY = \frac{abs(y - y_0)}{halfHeight} * k + 1 \quad (2)$$

$$compensationXY = compensationX + compensationY \quad (3a)$$

$$compensationXY = compensationX * compensationY, \quad (3b)$$

where k represents a scaling factor.

In another non-limiting example, two-dimensional compensation values are calculated according to Equation 4 using a number of coefficients:

$$compensationXY = a(x-x_0) + b(y-y_0) + c(x-x_0)(y-y_0) + d(x-x_0)^2 + e(y-y_0)^2 + f \quad (4)$$

In another non-limiting example, a combination of a thin plate bending model with a planar tilt model can be used as the basis for compensation values. Once the compensation values are determined, the location-compensated force can be determined according to Equation 5:

$$F_k \rightarrow F_k * compensationXY \quad (5)$$

Another non-limiting example includes performing calibration and curve fitting to determine compensation values.

Figure 10:
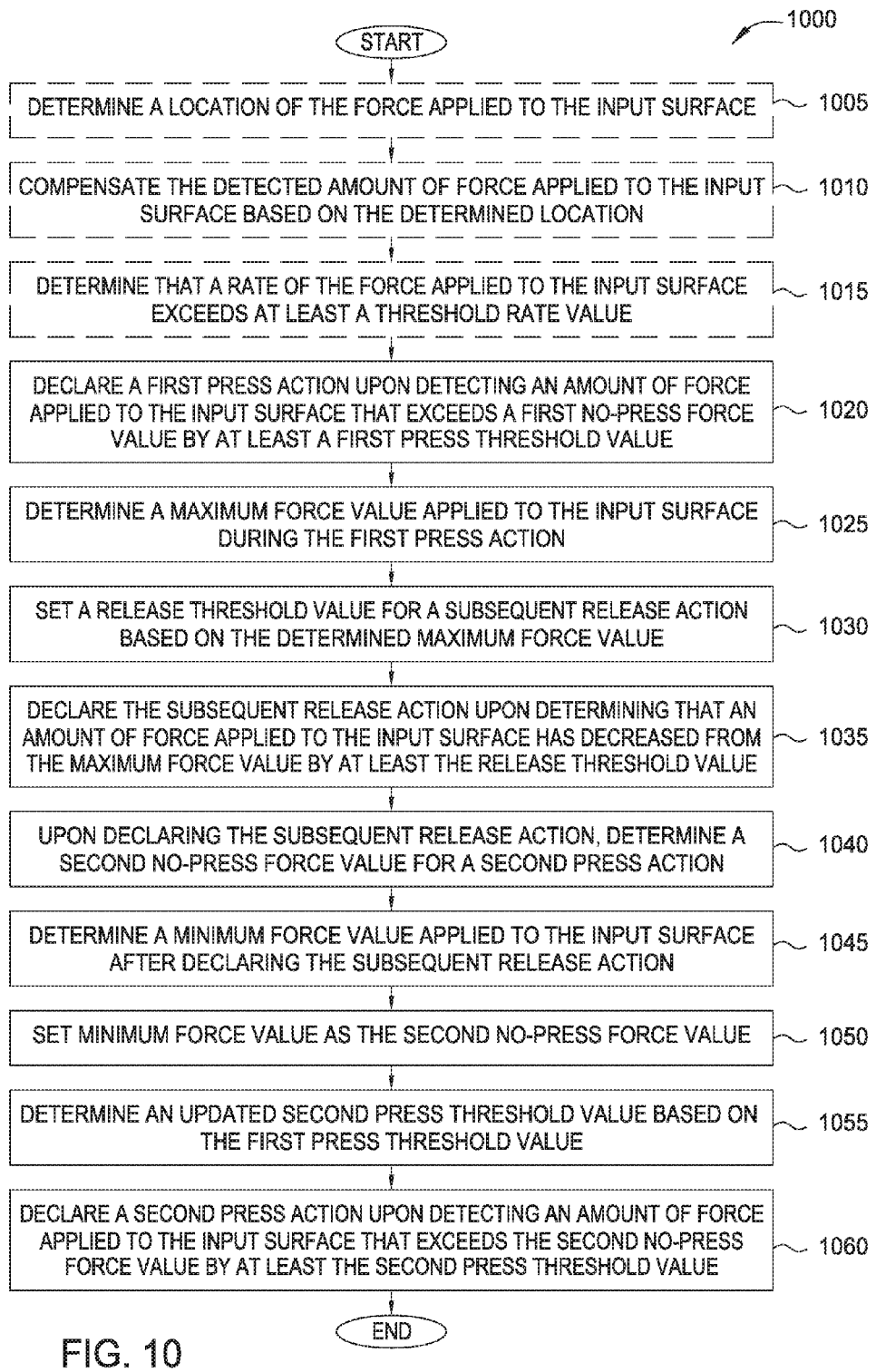
FIG. 10 is a method of operating a force-sensitive input device having an input surface, according to embodiments described herein.

FIG. 10 is a method of operating a force-sensitive input device having an input surface, according to embodiments described herein. Generally, method 1000 may be performed consistent with the various embodiments discussed above.

Method 1000 begins at optional block 1005, where the force sensing module 605 determines a location of the force applied to the input surface. At optional block 1010, the force sensing module compensates the detected amount of force applied to the input surface based on the determined location. In other embodiments, location compensation of force measurements is not performed by the force sensing module.

At optional block 1015, the force sensing module determines that a rate of the force applied to the input surface exceeds at least a threshold rate value. At block 1020, the force sensing module declares a first press action upon detecting an amount of force applied to the input surface that exceeds a first no-press force value by at least a first press threshold value. In some embodiments, a first press action is declared only when block 1015 is met.

At block 1025, the force sensing module determines a maximum force value applied to the input surface during the first press action. At block 1030, the force sensing module sets a release threshold value for a subsequent release action based on the determined maximum force value.

At block 1035, the force sensing module declares the subsequent release action upon determining that an amount of force applied to the input surface has decreased from the maximum force value by at least the release threshold value. At block 1040, upon declaring the subsequent release action, the force sensing module determines a second no-press force value for a second press action.

At block 1045, the force sensing module determines a minimum force value applied to the input surface after declaring the subsequent release action. At block 1050, the force sensing module sets minimum force value as the second no-press force value. At block 1055, the force sensing module determines an updated second press threshold value based on the first press threshold value.

At block 1060, the force sensing module declares a second press action upon detecting an amount of force applied to the input surface that exceeds the second no-press force value by at least the second press threshold value. Method 1000 ends following completion of block 1060.

Figure 11:
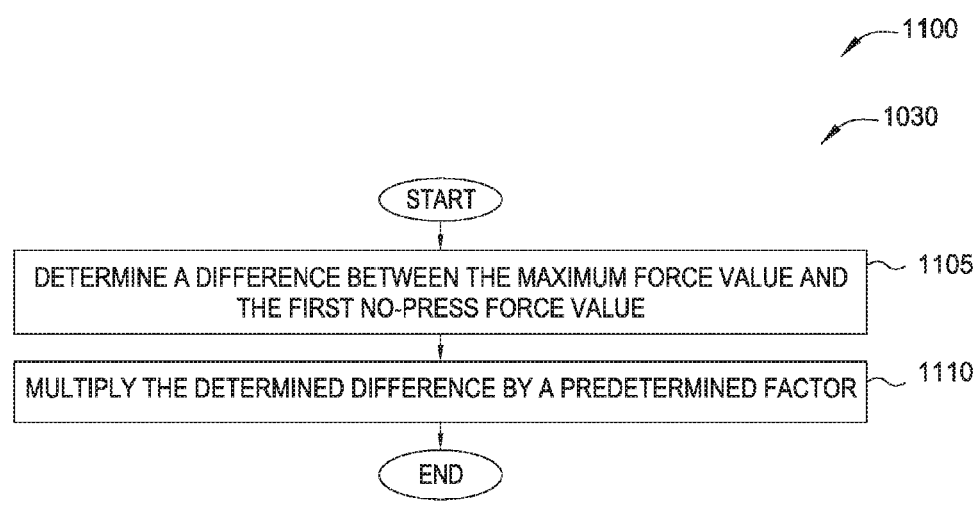
FIG. 11 is a method of setting a release threshold value for a release action for a force-sensitive input device, according to embodiments described herein.

FIG. 11 is a method of setting a release threshold value for a release action for a force-sensitive input device, according to embodiments described herein. Generally, method 1100 may be performed as part of block 1030 discussed above.

At block 1105, the force sensing module determines a difference between the maximum force value and the first no-press force value. At block 1110, the force sensing module multiplies the determined difference by a predetermined factor. Method 1100 ends following completion of block 1110.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A method of operating a force-sensitive input device having an input surface, the method comprising:
    declaring a first press action upon detecting a first amount of force applied to the input surface that exceeds a first no-press force value by at least a first press threshold value;
    determining a maximum force value applied to the input surface during the first press action;
    based on the determined maximum force value, determining a release threshold value; and
    declaring a release action based upon detecting that the first amount of force applied to the input surface during the first press action has decreased from the maximum force value by at least the release threshold value; and
    determining a second no-press force value for a second press action, wherein the second no-press force value differs from the first no-press force value.

2. The method of claim 1, wherein determining the release threshold value based on the maximum force value comprises:
    determining a difference between the maximum force value and the first no-press force value; and
    multiplying the determined difference by a predetermined factor.

3. The method of claim 1, wherein declaring the release action based upon detecting that the first amount of force has decreased from the maximum force value by at least the release threshold value comprises determining that the first amount of force is less than the release threshold value.

4. The method of claim 3, further comprising:
    determining the second no-press force value for the second press action upon declaring the release action.

5. The method of claim 4, further comprising:
determining a minimum force value applied to the input surface after declaring the release action,
wherein the second no-press force value is the determined minimum force value.

6. The method of claim 5, further comprising:
determining an updated second press threshold value based on the first press threshold value; and
declaring a second press action upon detecting an amount of force applied to the input surface that exceeds the second no-press force value by at least the second press threshold value.

7. The method of claim 1, wherein the first press threshold value differs from the release threshold value.

8. The method of claim 1, wherein declaring a start of the first press action is performed responsive to determining that a rate of the force applied to the input surface exceeds at least a threshold rate value.

9. The method of claim 1, further comprising:
determining a location of the force applied to the input surface,
wherein the detected amount of force applied to the input surface is compensated based on the determined location.

10. A processing system for a force-sensitive input device having an input surface, the processing system comprising:
a force sensing module communicatively coupled to a plurality of sensor electrodes of the input device,
wherein the force sensing module is configured to:
declare, based on signals received from the plurality of sensor electrodes, a first press action upon detecting a first amount of force applied to the input surface exceeding a first no-press force value by at least a first press threshold value;
determine a maximum force value applied to the input surface during the first press action;
based on the determined maximum force value, determine a release threshold value; and
declare a release action based upon detecting that a second the first amount of force applied to the input surface during the first press action has decreased from the maximum force value by at least sat-files the release threshold value; and
determine a second no-press force value for a second press action, wherein the second no-press force value differs from the first no-press force value.

11. The processing system of claim 10, wherein determining the release threshold value based on the maximum force value-comprises:
determining a difference between the maximum force value and the first no-press force value; and
multiplying the determined difference by a predetermined factor.

12. The processing system of claim 10, wherein declaring the release action based upon detecting that the first amount of force has decreased from the maximum force value by at least the release threshold value comprises:
declaring the release action upon determining that the first amount of force is less than the release threshold value.

13. The processing system of claim 12, wherein the force sensing module is further configured to:
determining second no-press force value for a second press action upon declaring the release action.

14. The processing system of claim 13, wherein the force sensing module is further configured to:
determine a minimum force value applied to the input surface after declaring the release action,
wherein the second no-press force value is the determined minimum force value.

15. The processing system of claim 14, wherein the force sensing module is further configured to:
determine an updated second press threshold value based on the first press threshold value; and
declare a second press action upon detecting an amount of force applied to the input surface that exceeds the second no-press force value by at least the second press threshold value.

16. The processing system of claim 10, further comprising:
a touch sensing module communicatively coupled to the plurality of sensor electrodes,
wherein the touch sensing module is configured to:
determine, based on the signals received from the plurality of sensor electrodes, a location corresponding to the force applied to the input surface,
wherein the force sensing module is further configured to compensate the detected amount of force applied to the input surface based on the determined location.

17. An input device comprising:
a plurality of sensor electrodes configured to detect positional information and force information of input objects in a sensing region of the input device, the sensing region overlapping an input surface of the input device;
a processing system communicatively coupled to the plurality of sensor electrodes, the processing system configured to:
declare, based on signals received from the plurality of sensor electrodes, a first press action upon detecting a first amount of force applied to the input surface exceeding a first no-press force value by at least a first press threshold value;
determine a maximum force value applied to the input surface during the first press action;
based on the determined maximum force value, determining a release threshold value;
declare a release action based upon detecting that a second amount of force applied to the input surface during the first press action satisfies the release threshold value; and
determine a second no-press force value for a second press action, wherein the second no-press force value differs from the first no-press force value.

18. The input device of claim 17, wherein declaring the release action based upon detecting that the first amount of force has decreased from the maximum force value by at least the release threshold value comprises:
declaring the release action upon determining that the second amount of force is less than the release threshold value.

19. The input device of claim 18, wherein the processing system is further configured to:
determine the second no-press force value for a second press action upon declaring the release action.

20. The input device of claim 17, further comprising:
a display, wherein the processing system is further configured to update the display using at least a subset of the plurality of sensor electrodes.

* * * * *

UNITED STATES PATENT AND TRADEMARK OFFICE
CERTIFICATE OF CORRECTION

PATENT NO. : 10,175,833 B2  
APPLICATION NO. : 15/080146  
DATED : January 8, 2019  
INVENTOR(S) : Ying Wang and Adam L. Schwartz Page 1 of 1

It is certified that error appears in the above-identified patent and that said Letters Patent is hereby corrected as shown below:

In the Claims

In Column 25, Line 39-40, In Claim 10, after "detecting that" delete "a second".

In Column 25, Line 42, In Claim 10, after "least" delete "sat-files".

Signed and Sealed this  
Twenty-eighth Day of April, 2020

Andrei Iancu  
*Director of the United States Patent and Trademark Office*